United States Patent Office 3,151,086
Patented Sept. 29, 1964

3,151,086
METHOD OF PREPARING THE FUEL ELEMENTS OF A LIQUID HOMOGENEOUS REACTOR
Milton C. Vanik, Brookeville, Moises G. Sanchez, Glen Burnie, and Ellsworth G. Acker, Baltimore, Md., assignors to W. R. Grace & Co., New York, N.Y., a corporation of Connecticut
No Drawing. Filed Feb. 8, 1960, Ser. No. 7,078
6 Claims. (Cl. 252—301.1)

This invention relates to a method of converting aqueous sols of thoria, urania and mixtures thereof to sols or dispersions of sol particles of these compounds in high boiling organic materials such as polyphenyls. More particularly, this invention relates to the preparation of sols or dispersions of sol particles of thoria, urania and mixtures thereof in organic moderator materials used in organic moderator type atomic reactors.

Liquid homogeneous reactors may be one of three types: burner reactors, convertor reactors or breeder reactors. Burner reactors are those in which fissionable materials are consumed as fuels but virtually no fuel is generated. Convertor reactors are those which produce a different fissionable fuel than is destroyed in the fission process. Breeder reactors are those which produce more of the same type of fissionable fuel as is being consumed in the reactor.

The nuclear reactions involved in liquid homogeneous reactors of this type are well known. A typical example is a two region reactor using a mixed thoria-urania sol as a fuel. In this reactor a core of uranium solution is surrounded by a blanket of thorium 233. As the uranium in the core fissions, it gives off neutrons, some of which are adsorbed by the thorium 232 to convert it to thorium 233. Thorium 233 decays with a half life of 23.3 minutes to yield protactinium 233 which in turn decays to uranium 233. Uranium 233 is a fissionable uranium isotope and is itself a suitable fuel. These breeder reactors may also be designed as single region reactors which contain a homogeneous mixture of fissionable and fertile material in a moderator. These reactors differ from single region reactors in that they have larger reactor diameters in order to minimize neutron losses.

In the aqueous homogeneous reactor systems, the moderator is water or heavy water. In the non-aqueous liquid homogeneous systems other media, principally organic liquids, are used as, for example, the polyphenyls. These high boiling organic materials have several advantages over water as the moderators in homogeneous liquid reactors. One obvious advantage, however, is that there is no pressure problem in operating at temperatures above 200° C. in that the media is chosen from organic compounds that boil in a temperature range of operation of the reactor. Aqueous systems operating at high temperatures and high pressures also tend to be corrosive toward the metals used in the reactor. Using a suitable organic compound as a moderator greatly simplifies this problem.

Liquid homogeneous reactors have several advantages over conventional type reactors used in nuclear power development. Briefly, these advantages reside in a higher power density than is available in a heterogeneous reactor, the ease with which fuel can be added to, and fission products removed from, the reactor system and the wide size latitude a liquid homogeneous reactor system allows, thus making possible reactors which range in size from very small units to reactors large enough to be utilized in nuclear power plants.

The prior art systems depend on the use of uranyl sulfate or uranyl phosphate in solution as a fuel in the aqueous homogeneous reactors. These reactor systems have not been particularly satisfactory because both the sulfuric acid and phosphoric acid systems show a definite tendency toward corroding the equipment. Sulfur has an appreciable adsorption cross-section so that neutron economy was also a factor to be considered.

Because of these disadvantages, considerable effort was expended toward preparing fuel systems which comprised solids, such as $UO_3$, which were placed in the reactor in slurry form. These slurries had several obvious disadvantages such as the erosion of the equipment and attrition of the materials themeslves.

It has been recognized that these problems can be solved by using sols or urania, thoria or thoria-urania as fuels in liquid homogeneous reactors. These types of sols have the advantage of being homogeneous particles of colloidal size and have been found to avoid the disadvantages that are present when thoria or urania slurries are used. There is, for example, no need to furnish agitation to prevent solids separation. These particles are not subject to attrition and, because of the small particle size of the sols (200 to 2000 A.), the problem of erosion of equipment is not important. Sols have relatively low viscosities and thus can be easily pumped.

The method of preparing aqueous metal oxide sols which are useful in aqueous homogeneous reactors and are amenable to coating with silica has been disclosed previously. Briefly, these sols may be prepared, for example, by dissolving a suitable salt of a uranium, thorium or a mixture of these salts in deionized water. The preferred salts are the nitrates or chlorides. This solution is placed in a suitable vessel, part of the solution is withdrawn and this portion is passed through a cathode compartment of an electrodialysis cell divided by a membrane of an ion exchange resin. This portion is then returned to the larger body of solution which is being maintained at an elevated temperature and this withdrawal dialysis and addition back is continued until the solution is essentially electrolyte free. The product sol is then densified by heating under non evaporative conditions and the dense sol passed through an ion exchange resin to remove electrolytes. These sols may then be clad with silica, if it is desirable to do so, using conventional hydrous silica to coat the sol particles. These sols are stable at the temperatures employed in nuclear reactors. The resulting product is a hydrous oxide sol which is dispersed in an aqueous medium.

We have found that aqueous sols of thoria, urania or mixtures thereof can be converted to high boiling organosols, organic dispersions of sol particles, that is, sols or dispersions in media such as polyphenyls that are useful as fuel elements in liquid homogeneous reactors.

The organo sols can be prepared by passing an aqueous sol of the type set out above through a column of mixture of cation and anion exchange resins, treating the deionized sol with an agent capable of neutralizing the charge on the particles and which acts as a flushing agent, that is, an agent which aids in transfer of the particles from one medium to another, followed by dispersion in an alcohol. The water remaining at this stage is removed from the sol by azeotrope distillation at the boiling point of the alcohol water azeotrope. The volume is maintained during distillation by the continuous addition of alcohol. As the dehydration continues, the boiling point of the sol rises until the boiling point of the alcohol is reached. The particles are transferred to the organic medium by adding the alcohol sol to a hot solution of the polyphenyl in alcohol at an elevated temperature and the alcohol removed by increasing the temperature to a temperature near the boiling point of the high boiling organic medium.

The first step in the treatment of the aqueous sols is the ion exchange treatment. We prefer to use a mixed hydrogen-hydroxyl ion exchange resin in this treatment.

Examples of suitable resins include: strong cationic resins in the hydrogen form such as, for example, the commercial resin Dowex 50 and strong anion resins in the hydroxyl form such as, for example, the commercial resin Amberlite IRA 400. The alcohols used in this process are primary and secondary monohydric alcohols containing at least 4 carbon atoms. Examples of alcohols of this class are: normal straight chain alcohols such as n-butyl, n-amyl, n-hexyl, n-heptyl, n-octyl, etc.; branch chain primary alcohols such as isobutyl, isoamyl, 2,2,4 trimethyl-1 hexanol, etc.; secondary alcohols such as secondary butyl, 2 pentanol, 2 octanol, etc. The flushing and neutralizing agent used in the second step of this process should be selected so that it is capable of neutralizing the charge on the particles to protect them from aggregation by coating the particles with the agent. Thus, if a silica clad sol is used, the charge on the particle is negative so that a cationic agent would be chosen. Suitable high boiling cationic agents include, for example, n-hexylamine, n-heptylamine, n-octylamine, n-nonylamine, n-decylamine, etc. Preferred agents include: n-heptylamine, n-hexylamine and n-octylamine. Where the sol is not coated, the charge on the particles will be positive and an anionic agent must be used to neutralize the charge and to coat the particles to prevent aggregation. Suitable anionic agents include: straight chain fatty acids such as caproic, heptoic and caprylic acid, or branch chain fatty acids with limited water solubility such as isovaleric, isocaproic, etc., or phenyl derivatives of fatty acids such as $\alpha$-phenyl propionic acid. The preferred agent is a high boiling point organic acid such as decanoic acid.

The organic media useful for preparing these dispersions are organic compounds boiling in the range of 250° C. In the liquid homogeneous reactors that have been operating to date, the polyphenyls, specifically biphenyl, have been used as the organic media. Other materials such as polyphenols and phenyl ethers would probably be suitable organic media for use in the preparation of organic moderated fuel systems for liquid homogeneous reactors.

The temperature of operation of the process disclosed in this invention is of course dependent on the boiling point of the alcohol water azeotrope in the dehydration step, the boiling point of the alcohol in the stabilization step, and the boiling point of the organic medium to which the sol is being transferred. Suitable results have been obtained in the butyl alcohol stabilization step, for example, by operating in the range of 90 to 150° C. The preferred range of operation is 92 to 120° C. The temperature in the last step in the preparation of the sols in polyphenyls, for example, is on the order of 250° C.

Pressure is not critical but for reasons of economy and ease of operation we prefer to carry out the process at atmospheric pressure. However, the reaction can be run at pressures above or below atmospheric in cases where it would be advantageous to do so.

The invention is further illustrated by the following typical but non-limiting examples.

Example I

An aqueous silica clad thoria sol was prepared and was converted to the n-butyl alcohol sol, and finally transferred to biphenyl in order to prepare a sol in that medium. The aqueous sol was prepared as follows: 4000 grams of a solution of thorium nitrate and deionized water containing 10% by weight equivalent $ThO_2$ was charged into a heated reservoir for use in preparing a thoria sol. This sol was circulated at a rate of approximately 150 cc./min. through the cathode compartment of an electrodialysis cell divided by an ion exchange membrane of Amberplex A1. The temperature in the reservoir was maintained at 82 to 97° C. The thorium nitrate solution was withdrawn from this vessel at a rate of 150 cc./min. through a cooled heat exchanger and pumped into the above described cell. The temperature of the incoming solution was controlled to maintain a cell temperature of about 25 to 32° C. The solution leaving the cell was passed through a heat exchanger where it was heated to 92 to 97° C. and then returned to the reservoir. Evaporation losses were compensated for by the addition of deionized water as needed. Circulation of the solution was continued over a total period of about 30 hours. During electrolysis the amperage dropped from about 10 to a value of about 1.5 The pH rose from about 2 to about 6.7.

The thoria sol was coated with silica using the following technique. Several liters of silica sol were prepared by passing a nominal 2% silica-sodium sol were prepared through an acid regenerated ion exchange resin. Two liters of this freshly prepared silica sol was added rapidly with vigorous agitation to 2 liters of thoria sol prepared by the method described above which had been further deionized by passing it through an ion exchange resin. An additional 2 liters of the silica sol was added somewhat more slowly to yield a final silica clad sol. A total of 415 ml. of 1 normal sodium hydroxide was added to adjust the pH and entire system and was refluxed at 100° C. for 24 hours. The refluxed sol was then passed through a cation deionizing resin to give a product sol. The pH of the sol was adjusted by the addition of 50 cc. of 1 normal sodium hydroxide. The sol had the following characteristics:

| | |
|---|---|
| pH | 8.5. |
| Resistivity | $1.74 \times 10^{-3}$ ohms. |
| Relative viscosity | 1.368. |
| Solids content | 43.7%. |
| Thoria content | 25.3%. |
| Particle size | 250 to 1000 A. |

This sol was diluted to 6% solids and used to prepare a normal butyl alcohol sol. A charge of 500 ml. of this silica clad thoria sol was passed through a mixed bed resin column in the hydroxyl and hydrogen form. The sol, after treatment in the column, had a pH of 3.8. The deionized sol was transferred to a flask and 2.6 grams of normal heptylamine was added with stirring and stirring was continued for an additional period of ten minutes. At the end of this time the sol had a pH of 11.3. The sol was transferred to a separatory funnel containing an equal quantity, 500 ml., of butyl alcohol and the mixture was stirred vigorously and allowed to stand overnight. At the end of this time the water was removed from the bottom of the separatory funnel and the alcohol layer was transferred to a flask equipped with a dropping funnel, stirrer, distillation equipment, and a heating mantle. The sol was stirred and the temperature brought to 92.5 at which point the butyl alcohol water azeotrope distilled from the sol. Butyl alcohol was added continuously to replace the volume lost through the distillation. The temperature rose to 118° C., indicating the water had been replaced by the butyl alcohol. The sol was maintained at this temperature for a period of two hours. This product was combined with two other normal butyl alcohol sols prepared in exactly the same manner and the three products, heated to about 100° C., were added to 207 grams of biphenyl which had been slurried in 100 ml. of butyl alcohol and heated to 120 to 125° C. The hot butyl alcohol sol was added to the biphenyl mixture until a concentration of 30% solids with respect to biphenyl was reached. The temperature was increased from 120 to nearly 250° C. to remove the alochol. The sol was allowed to cool at room temperature at which time it solidified. Solidification and remelting of the biphenyl apparently did not affect the properties of the sol.

Example II

Sols of unclad thoria in n-butyl alcohol were prepared using thoria sols resulting from the electrodialysis of a thorium salt carried out with the method set out in Example I above. In a typical run, 130 ml. of a thoria sol containing 4% thoria and having a pH of 5.2 and a particle size distribution of about 300 to 1000 Angstroms was run through a mixed bed ion exchange resin column in the hydroxyl and hydrogen form and a sol having a pH of 9.5 that contained 5% thoria was recovered. A change of 0.5 gram of decanoic acid was added to this sol and the temperature raised to 45° C. for 10 minutes. This treatment reduced the pH of the sol to 8.0. The sol was then dispersed in 130 ml. of n-butyl alcohol by shaking in a separatory funnel. An emulsion was formed which did not separate after standing 24 hours at room temperature. The contents of the separatory funnel were transferred to a flask for removal of the water as a water-butyl alcohol azeotrope at a temperature of 92.5° C. Any volume lost was restored by the continuous addition of dry n-butyl alcohol. After water removal was complete, the temperature of the vessel was increased to 118° C. This sol was run into a solution of 100 g. biphenyl which had been melted and dissolved in 200 ml. n-butyl alcohol and the temperature increased to 118° C. The butyl alcohol sol was added until the concentration of thoria in the biphenyl was 5%. The temperature of the dispersion of the sol particles was raised to 250° C. to remove the alcohol. The biphenyl dispersion was heated to 240° C. for 7 hours in a Vycor tube to determine its thermal stability. At the end of this time the dispersion was examined and no evidence of deterioration was noted. These data illustrate that a biphenyl dispersion of unclad thoria can be prepared which is stable in the range of 240 to 250° C.

Obviously many modifications and variations of the invention as hereinabove set forth may be made without departing from the essence and scope thereof and only such limitations should be applied as are indicated in the appended claims.

We claim:
1. A non-aggregating dispersion of sol particles comprising particles in the 200 to 2000 Angstrom unit size range of an inorganic oxide selected from the group consisting of thoria, urania and mixtures thereof dispersed in a polyphenyl medium and substantially free from contaminating electrolytes.

2. As a composition of matter a stable sol in a polyphenyl medium having a boiling point of at least 220° C. of finely divided particles of an inorganic oxide selected from the group consisting of thoria, urania and mixtures thereof having a particle size in the range of about 200 to 2000 Angstroms and a uniform coating of hydrous silica about 30 to 120 Angstroms thick.

3. As a composition of matter a stable sol in a polypenyl medium having a boiling point of at least 220° C. of finely divided particles of an inorganic oxide selected from the group comprising thoria, urania and mixtures thereof, having a particle size in the range of about 200 to 2000 Angstrom units and a uniform coating of hydrous silica about 30 to 120 Angstroms thick and a solids content of about 5 to 20%.

4. As a composition of a matter a biphenyl sol of finely divided particles of an inorganic oxide selected from the group consisting of thoria, urania and mixtures thereof, having a particle size in the range of about 200 to 2000 Angstroms and a solids content of about 5 to 20%.

5. As a composition of matter a stable biphenyl sol of finely divided thoria particles having a particle size in the range of about 200 to 2000 Angstroms and a uniform coating of hydrous silica about 30 to 120 Angstroms thick.

6. As a composition of matter a biphenyl sol of finely divided thoria particles having a particle size in the range of about 200 to 2000 Angstroms and a solids content in the range of about 5 to 20%.

References Cited in the file of this patent

UNITED STATES PATENTS

| | | |
|---|---|---|
| 2,285,477 | White | June 9, 1942 |
| 2,601,352 | Wolter | June 24, 1952 |
| 2,692,863 | Isler | Oct. 26, 1954 |
| 2,786,042 | Isler | Mar. 19, 1957 |
| 2,824,784 | Hansen et al. | Feb. 25, 1958 |
| 2,877,091 | Hiskey | Mar. 10, 1959 |
| 2,885,366 | Isler | May 5, 1959 |
| 2,920,024 | Barton et al. | Jan. 5, 1960 |
| 3,002,808 | La Mont | Oct. 3, 1961 |

FOREIGN PATENTS

| | | |
|---|---|---|
| 753,399 | Great Britain | July 25, 1956 |

OTHER REFERENCES

Weiser: "Inorganic Colloid Chemistry," vol. 2, pp. 271-275, 321, 322 (1935).

ORNL 1812, Jan. 27, 1955.

ORNL 2345, Aug. 22, 1957.

Lane et al.: "Fluid Fuel Reactors," pp. 128–132 (1958).

Proceedings of Second U.N. Conference on Peaceful Uses of Atomic Energy, vol. 9, pages 468–470; vol. 29, pages 292–311, September 1958.